United States Patent
Bommer et al.

(10) Patent No.: US 11,063,455 B2
(45) Date of Patent: Jul. 13, 2021

(54) METHOD FOR ADAPTING THE VOLTAGE SUPPLIED BY A HIGH-PERFORMANCE ELECTROCHEMICAL STORAGE DEVICE, AND A SYSTEM FOR OPERATING A LOAD

(71) Applicant: Robert Bosch GmbH, Stuttgart (DE)

(72) Inventors: Lars Bommer, Leonberg (DE); Mathias Widmaier, Magstadt (DE); Michael Donotek, Asperg (DE); Severin Hahn, Kirchheim Unter Teck (DE); Tobias Schonhardt, Voerstetten (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 16/316,942

(22) PCT Filed: Jul. 4, 2017

(86) PCT No.: PCT/EP2017/066643
§ 371 (c)(1),
(2) Date: Jan. 10, 2019

(87) PCT Pub. No.: WO2018/011019
PCT Pub. Date: Jan. 18, 2018

(65) Prior Publication Data
US 2019/0245367 A1  Aug. 8, 2019

(30) Foreign Application Priority Data
Jul. 11, 2016  (DE) .......................... 102016212554.0

(51) Int. Cl.
*H02J 7/00* (2006.01)
*H01M 10/48* (2006.01)
(Continued)

(52) U.S. Cl.
CPC ......... *H02J 7/0063* (2013.01); *H01M 10/443* (2013.01); *H01M 10/486* (2013.01);
(Continued)

(58) Field of Classification Search
CPC ............... H02J 7/0063; H02J 7/007188; H02J 7/007194; H02J 7/007192; H01M 10/486; H01M 10/443
(Continued)

(56) References Cited

U.S. PATENT DOCUMENTS 3,684,997 A * 8/1972 Masuda .................... G06G 7/20
338/32 H
5,382,893 A * 1/1995 Dehnel .................... H02J 9/061
320/160

(Continued)

FOREIGN PATENT DOCUMENTS

| EP | 2665151 A1 | 11/2013 |
| JP | H1064770 A | 3/1998 |
| JP | H10154640 A | 6/1998 |

OTHER PUBLICATIONS

"What is the difference between the formule Pmax=(|vth|^2)/(4*Rth) and Pmax=(|vth|^2)/(8*Rth) in the maximum power transfer theorem?," Jose Soares Augusto, Quora, Published Online Jan. 24, 2018, seen Online Jul. 15, 2020 https://www.quora.com/What-is-the-difference-between-the-formule-Pmax-vth-2-4-Rth (Year: 2018).*
(Continued)

*Primary Examiner* — John T Trischler
(74) *Attorney, Agent, or Firm* — Norton Rose Fulbright US LLP; Gerard A. Messina (57) ABSTRACT

A method and system for adapting the voltage supplied by a high performance electrochemical storage device provide for: supplying a voltage for a load using a high-performance electrochemical storage device; monitoring the temperature
(Continued)

of the high-performance electrochemical storage device; an adapting the voltage supplied by the high-performance electrochemical storage device as a function of a change in the monitored temperature thereof in a way that counters a change in the value of the power density of the high-performance electrochemical storage device attributable to the temperature change.

6 Claims, 5 Drawing Sheets

(51) Int. Cl.
    *H01M 10/44*     (2006.01)
    *H01M 10/42*     (2006.01)
    *H02J 7/34*     (2006.01)

(52) U.S. Cl.
    CPC .. *H02J 7/007188* (2020.01); *H02J 7/007192* (2020.01); *H02J 7/007194* (2020.01); *H01M 10/4257* (2013.01); *H01M 2010/4271* (2013.01); *H02J 7/007* (2013.01); *H02J 7/0025* (2020.01); *H02J 7/0071* (2020.01); *H02J 7/345* (2013.01); *H02J 2007/0067* (2013.01)

(58) Field of Classification Search
    USPC ............................................................ 320/167
    See application file for complete search history.

(56) References Cited

U.S. PATENT DOCUMENTS

| | | | | |
|---|---|---|---|---|
| 5,430,363 | A * | 7/1995 | Kim | H01M 10/44 320/128 |
| 5,956,627 | A * | 9/1999 | Goos | H03G 1/04 455/126 |
| 6,232,744 | B1 * | 5/2001 | Kawai | G01R 31/396 320/132 |
| 7,002,112 | B2 * | 2/2006 | Kishi | G03G 15/2039 219/216 |
| 7,247,816 | B2 * | 7/2007 | Kishi | G03G 15/2039 219/216 |
| 7,396,605 | B2 * | 7/2008 | Van Zee | H01M 8/0662 429/410 |
| 7,546,050 | B2 * | 6/2009 | Kishi | G03G 15/2039 399/69 |
| 7,658,247 | B2 * | 2/2010 | Carter | H02J 7/1407 180/65.24 |
| 7,786,706 | B2 * | 8/2010 | Yamashita | H02J 7/0077 320/162 |
| 7,870,916 | B2 * | 1/2011 | Carter | H02J 7/1407 180/65.24 |
| 8,437,910 | B2 * | 5/2013 | Yoshizawa | B60R 16/03 701/36 |
| 8,569,999 | B2 * | 10/2013 | Hurley | H02J 7/00308 320/144 |
| 8,798,826 | B2 * | 8/2014 | Ichikawa | B60L 50/00 701/22 |
| 8,884,461 | B2 * | 11/2014 | Nishi | B60L 50/72 307/10.1 |
| 8,957,623 | B2 * | 2/2015 | Sisk | B60L 58/20 320/101 |
| 9,206,584 | B2 * | 12/2015 | Kawaguchi | B60L 15/2009 |
| 9,300,018 | B2 * | 3/2016 | Watson | H01M 10/06 |
| 9,425,492 | B2 * | 8/2016 | Mao | H01M 16/00 |
| 9,819,042 | B2 * | 11/2017 | Berlowitz | H01M 8/145 |
| 9,819,064 | B2 * | 11/2017 | Jiang | B60L 58/14 |
| 10,020,122 | B2 * | 7/2018 | Hahn | H01G 11/04 |
| 10,056,628 | B2 * | 8/2018 | Kim | H01M 8/04552 |
| 10,153,097 | B2 * | 12/2018 | Buehler | H01G 11/52 |
| 10,158,152 | B2 * | 12/2018 | Watson | B60L 58/14 |
| 10,269,507 | B2 * | 4/2019 | Buehler | H01G 11/60 |
| 10,283,802 | B2 * | 5/2019 | Berlowitz | H01M 8/0668 |
| 10,290,912 | B2 * | 5/2019 | Jiang | B60L 58/20 |
| 10,381,168 | B2 * | 8/2019 | Buehler | H01G 11/62 |
| 10,381,169 | B2 * | 8/2019 | Buehler | H01G 11/64 |
| 2003/0105562 | A1 * | 6/2003 | Hsiao | B60L 58/40 701/22 |
| 2003/0235728 | A1 * | 12/2003 | Van Zee | H01M 8/0662 429/410 |
| 2004/0065489 | A1 | 4/2004 | Aberle et al. | |
| 2004/0149740 | A1 * | 8/2004 | Kishi | G03G 15/2039 219/660 |
| 2006/0091130 | A1 * | 5/2006 | Kishi | G03G 15/2039 219/482 |
| 2006/0098038 | A1 * | 5/2006 | Im | B41J 2/3558 347/14 |
| 2006/0222916 | A1 * | 10/2006 | Norimatsu | H01M 8/04597 429/431 |
| 2007/0183806 | A1 * | 8/2007 | Kishi | G03G 15/2039 399/69 |
| 2008/0003462 | A1 * | 1/2008 | Aleyraz | H01M 8/04559 429/431 |
| 2008/0066979 | A1 | 3/2008 | Carter | |
| 2008/0094036 | A1 * | 4/2008 | Yamashita | H02J 7/00712 320/162 |
| 2009/0140697 | A1 * | 6/2009 | Hurley | H02J 7/00711 320/139 |
| 2010/0131136 | A1 * | 5/2010 | Ichikawa | H02M 3/1584 701/22 |
| 2010/0148582 | A1 * | 6/2010 | Carter | B60L 58/22 307/48 |
| 2012/0158245 | A1 * | 6/2012 | Yoshizawa | B60R 16/03 701/36 |
| 2012/0235473 | A1 | 9/2012 | Jiang et al. | |
| 2012/0235511 | A1 * | 9/2012 | Watson | B60L 58/15 307/109 |
| 2012/0235624 | A1 * | 9/2012 | Sisk | B60L 58/22 320/101 |
| 2012/0235642 | A1 * | 9/2012 | Mao | H01M 2/1072 320/112 |
| 2012/0237799 | A1 * | 9/2012 | Jiang | H01M 10/4264 429/7 |
| 2014/0117942 | A1 * | 5/2014 | Fisher | H02J 7/0063 320/136 |
| 2014/0203633 | A1 * | 7/2014 | Nishi | B60L 50/16 307/10.1 |
| 2015/0081147 | A1 | 3/2015 | Kawaguchi | |
| 2015/0093676 | A1 * | 4/2015 | Berlowitz | C10G 2/32 429/464 |
| 2016/0176298 | A1 * | 6/2016 | Watson | B60L 3/0046 307/10.6 |
| 2017/0069434 | A1 * | 3/2017 | Verma | H01G 11/60 |
| 2017/0069435 | A1 * | 3/2017 | Buehler | H01G 11/08 |
| 2017/0092439 | A1 * | 3/2017 | Hahn | H01G 11/34 |
| 2017/0162338 | A1 * | 6/2017 | Buehler | H01G 11/36 |
| 2017/0229253 | A1 * | 8/2017 | Buehler | H01G 11/64 |
| 2017/0250032 | A1 * | 8/2017 | Buehler | H01G 11/46 |
| 2017/0250034 | A1 * | 8/2017 | Buehler | H01G 11/04 |
| 2017/0294666 | A1 * | 10/2017 | Kim | H01M 8/04302 |
| 2017/0352497 | A1 * | 12/2017 | Buehler | H01G 11/30 |
| 2017/0352498 | A1 * | 12/2017 | Buehler | H01G 11/02 |
| 2018/0034089 | A1 * | 2/2018 | Berlowitz | C10G 2/32 |
| 2019/0272962 | A1 * | 9/2019 | Buehler | H01M 4/134 |

OTHER PUBLICATIONS

"Maximize Power Delivered to Circuits Optimization Problem," AnalyzeMath, seen Online Jul. 15, 2020, https://www.analyzemath.com/calculus/Problems/maximum_power_delivered.html.*

"How is Pmax Derived," Xbuoix, Physics Forums, Published online Mar. 13, 2013, Accessed Online Sep. 14, 2020, https://www.physicsforums.com/threads/how-is-pmax-derived.678185/.*

(56) References Cited

OTHER PUBLICATIONS

International Search Report dated Oct. 12, 2017 of the corresponding International Application PCT/EP2017/066643 filed Jul. 4, 2017.

* cited by examiner

PRIOR ART

Fig. 3

PRIOR ART

Fig. 5 shows 3 power density levels (1, 2, 3) (surface areas under the U^2 (voltage squared) constants at 3 temperatures, where T1 < T2 < T3
In Fig. 5, P (power) = U^2 / 4Ri

METHOD FOR ADAPTING THE VOLTAGE SUPPLIED BY A HIGH-PERFORMANCE ELECTROCHEMICAL STORAGE DEVICE, AND A SYSTEM FOR OPERATING A LOAD

CROSS-REFERENCE TO RELATED APPLICATIONS

The present application is the national stage of International Pat. App. No. PCT/EP2017/066643 filed Jul. 4, 2017, and claims priority under 35 U.S.C. § 119 to DE 10 2016 212 554.0, filed in the Federal Republic of Germany on Jul. 11, 2016, the content of each of which are incorporated herein by reference in their entireties.

FIELD OF THE INVENTION

The present invention relates to a method for adapting the voltage supplied by a high performance electrochemical storage device, the method including using a high-performance electrochemical storage device to supply a voltage for a load; monitoring the temperature of the high-performance electrochemical storage device; and adapting the voltage supplied by the high-performance electrochemical storage device as a function of a change in the monitored temperature thereof.

BACKGROUND

In addition to the generally known lithium-ion batteries, electrochemical capacitors, also referred to as supercapacitors, are playing an ever greater role. Supercapacitors that are already commercially available are used for automotive applications and for stationary systems. Electrochemical energy storage devices can be characterized, in particular by the energy density, and the power density thereof. The energy density is indicated in kWh/kg or kWh/l and specifies the amount of energy per weight or per volume that can be stored in the energy storage device. It is one of the most important variables used to compare various energy storage systems and is decisive for the curb weight of a vehicle, for example. The greater the energy density is, the smaller or more lightweight the energy storage device can be at the same capacity. On the other hand, the power density specifies how much power can be drawn from the energy storage device per volume or mass. This quantity is important for the acceleration performance and/or the velocity of a vehicle. Generally, supercapacitors have a higher power density and a lower energy density than lithium-ion batteries. Thus, lithium-ion batteries are preferred for energy-intensive applications and supercapacitors for power-intensive applications. Generally, supercapacitors are classified as what are commonly known as electric double layer capacitors, pseudocapacitors, and hybrid supercapacitors.

Double layer capacitors and pseudocapacitors have a high power density, but a low energy density. On the other hand, hybrid supercapacitors have both a high power density, as well as a high energy density and thus, as it were, fill the gap between lithium-ion batteries and supercapacitors. At present, however, both lithium ion batteries as well as supercapacitors are greatly limited with regard to the operating temperature thereof. The operating temperature of lithium-ion batteries is within a very small range of between 20° C. and 40° C. On the other hand, supercapacitors can be operated within a broader temperature spectrum of −40° C. to 70° C.

At the same time, electrochemical energy storage devices, which are suited for a use within a very broad temperature range, for example within a temperature range of approximately −40 to 120° C., are increasingly gaining in importance, most notably in the automotive industry. What is problematic in high temperature applications is, in particular, the decomposition of the electrolyte at high voltages. The high voltage and temperature intensify secondary reactions, which are responsible for the decomposition of the electrolyte, between the various components of the energy storage device, such as the electrodes and the electrolyte, for example. This causes lasting damage to and loss of capacity of the cell. In addition, in the case of lithium ion batteries, what is generally referred to as the solid electrolyte interface, which protects the anode material from direct contact with the electrolyte, is permanently damaged at high temperatures. This can cause the cell to fail. Nevertheless, there are already rechargeable high-temperature lithium-ion batteries which, however, have a very short lifetime and only very low charge/discharge rates at high temperatures and are completely unusable for power-intensive applications. At low temperatures, the performance of supercapacitors and of lithium-ion batteries drops off sharply since the viscosity of the electrolyte increases significantly, and the performance thereby decreases significantly. The available potential window, respectively voltage window of the respective energy storage device, which determines the cell voltage of a lithium-ion battery or of a supercapacitor, is likewise influenced by the temperature.

Figure 1:
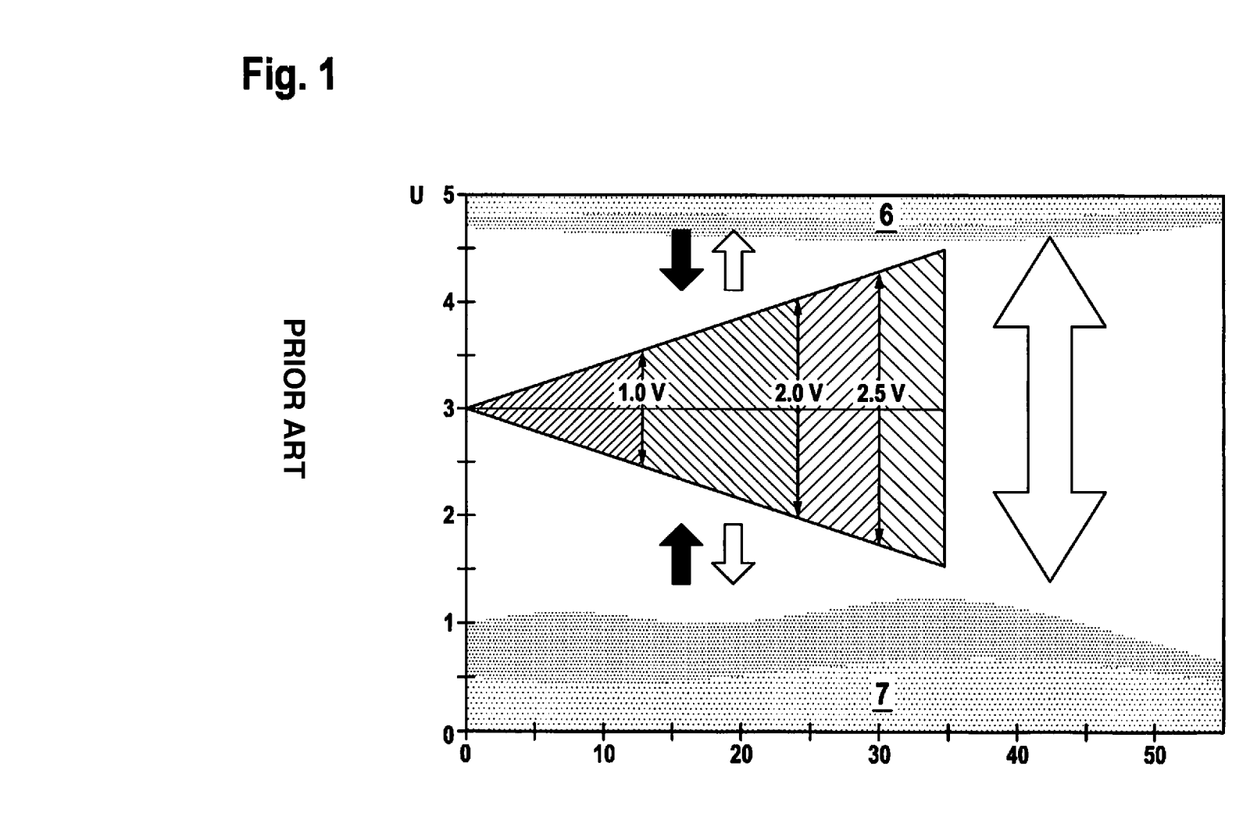
FIG. 1 shows the voltage window of a conventional double layer capacitor.

FIG. 1 shows a voltage window of a conventional double layer capacitor in a coordinate system, for example. Here, the ordinate of the coordinate system shows the voltage, respectively the potential of the double layer capacitor, while the specific capacity of the double layer capacitor is plotted in mAh/g on the abscissa of the coordinate system. The voltage window shown in FIG. 1 extends between two linear segments intersecting at point (0/3) of the coordinate system, of which the bottom linear segment represents the potential of the anode, while the upper linear segment represents the potential of the cathode of the double layer capacitor. The vertical double arrows represent the width of the voltage window and thus the cell voltage of the double layer capacitor that can be supplied, while the simple black arrows represent the influence of high temperatures on the voltage window, and the simple white arrows the influence of low temperatures on the voltage window. Thus, the maximum voltage window increases at low temperatures since the secondary reactions described above—in comparison to an operation at room temperature—start only at higher cell voltages. On the other hand, the maximum voltage window decreases at high temperatures since the secondary reactions begin already at cell voltages that are lower than an operation at room temperature. In addition, FIG. 1 shows two voltage ranges 6, 7, the upper characterizing a voltage range in which a gas formation on the basis of oxidative decomposition occurs, and the lower characterizing a voltage range in which a gas formation on the basis of reductive decomposition occurs.

At present, there is still no system based on high-performance electrochemical storage devices, thus, for example, based on conventional supercapacitors or hybrid supercapacitors, capable of supplying moderate power both in the high-temperature, as well as in the low-temperature range. This is due to the fact that high-temperature stable electrolytes, such as carbonates, for example, ionic liquids, gel electrolytes, or solid electrolytes have a low ionic conductivity, especially at low temperatures.

Figure 2:
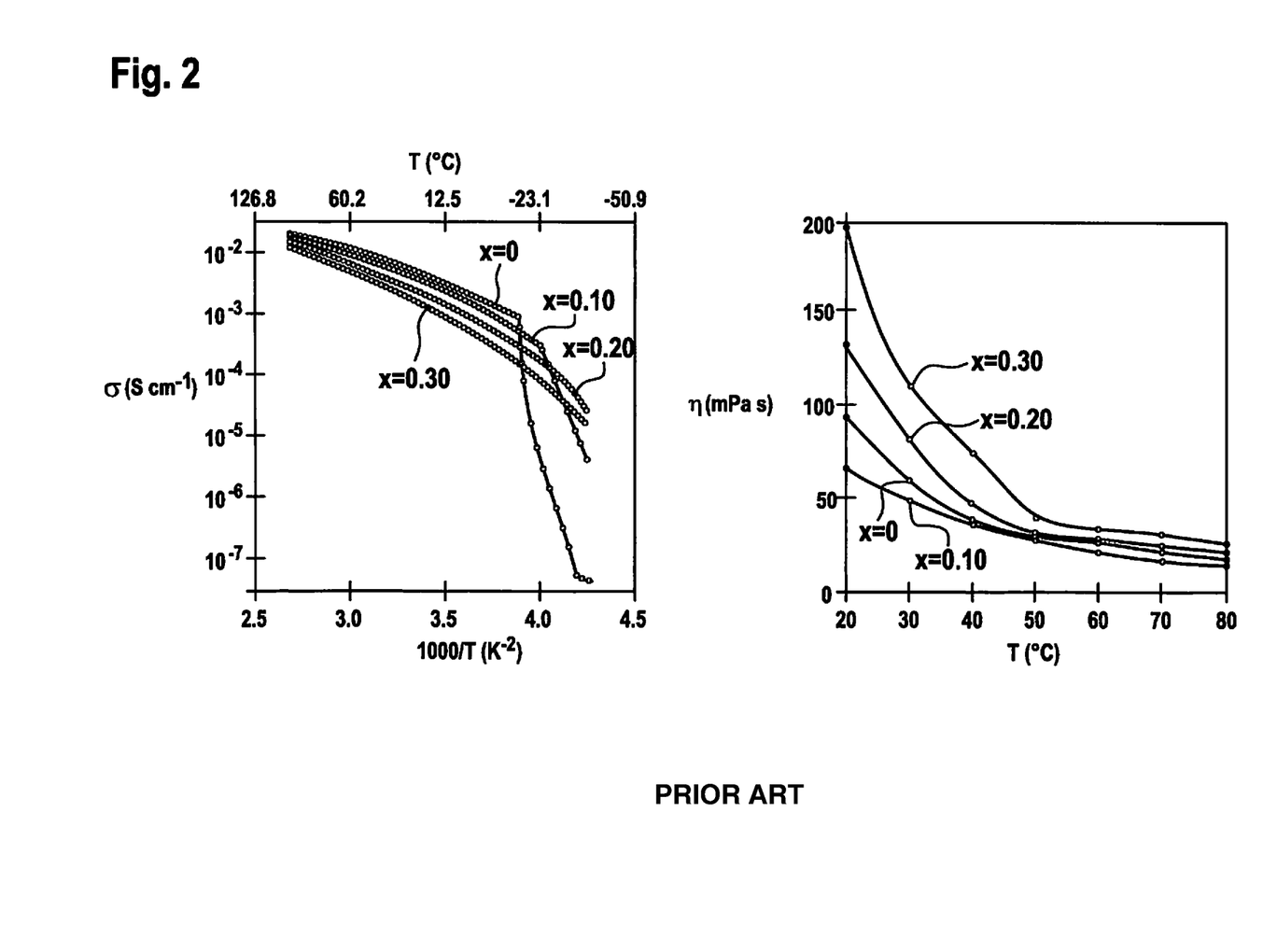
FIG. 2 shows the conductivity (left) and the viscosity (right) of an electrolyte as a function of the temperature.

It is known that an increase in temperature causes the viscosity of electrolytes to decrease and, accordingly, for the conductivity of the same to increase. Conversely, the viscosity of electrolytes increases and the conductivity of the same decreases as the temperature drops. This correlation is shown in FIG. 2. FIG. 2 shows the conductivity (left), as well as the viscosity (right) of an electrolyte as a function of the temperature, in each particular case in a diagram. Purely exemplarily, the electrolyte is the ionic liquid $Pyr_{14}FSI$. To the left in FIG. 2, conductivity $\sigma$ (S cm$^{-1}$) is plotted over the temperature. On the one hand, the temperature is plotted in ° C. (at the top) and in 1000/T (K$^{-2}$) (at the bottom). To the right in FIG. 2, viscosity 11 (mPa s) is plotted over the temperature in ° C.

The conductivity plays an important role for internal resistance $R_i$ of a cell, which is also referred to as ESR. Internal resistance $R_i$ is derived from a multiplicity of various quantities, such as the particle-particle resistance, for example, the contact resistance between the electrode and current diverter, as well as from ionic electrolyte resistance $R_T$ of a cell. The temperature is, in fact, mainly influenced by this ionic electrolyte resistance $R_T$, as expressed by the equation $$R_T = R_{20} \frac{\{1 + \exp[-k_T(T - T_{20})]\}}{2}.$$

Figure 3:
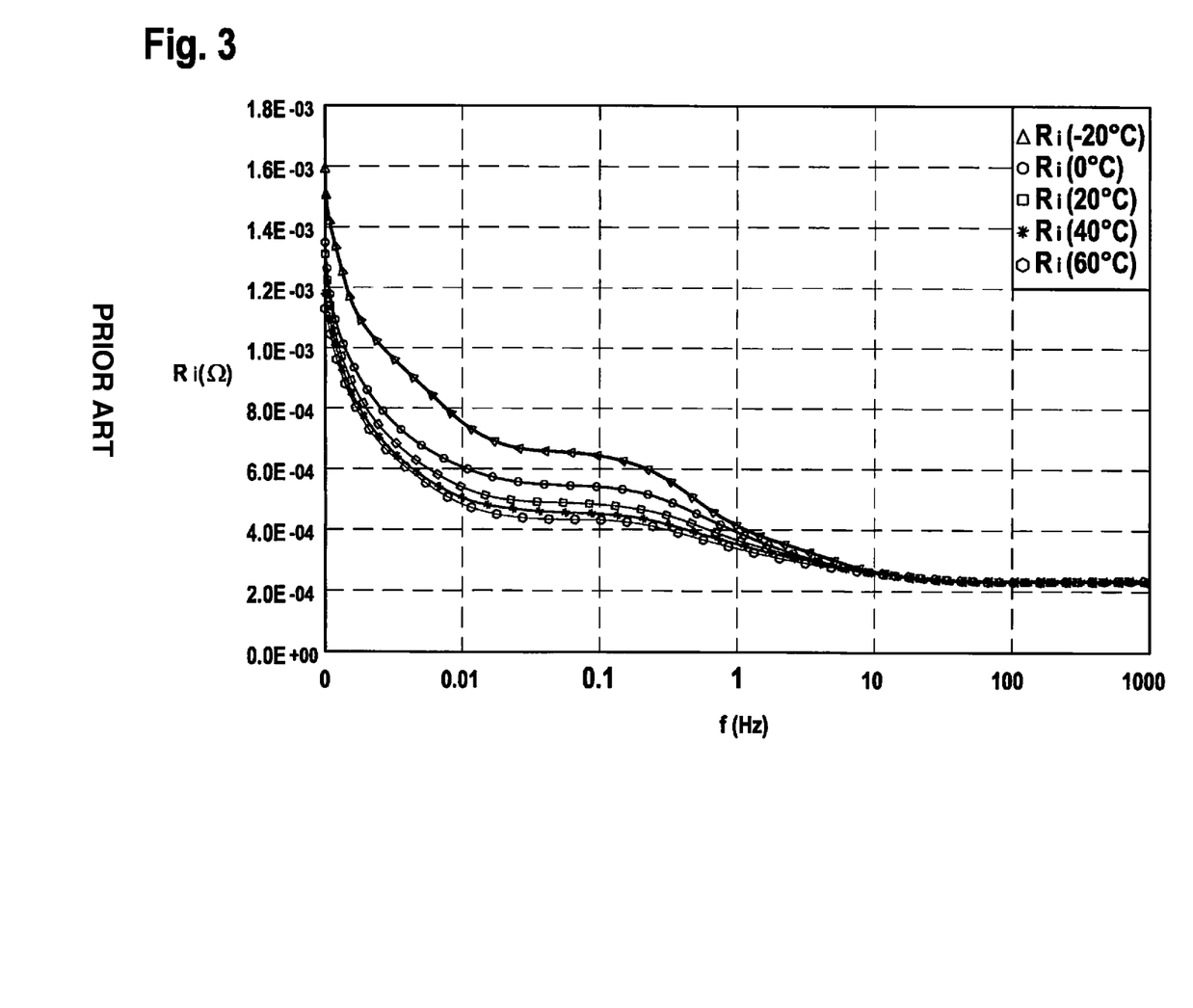
FIG. 3 shows internal resistance $R_i$ of a related-art high-performance electrochemical storage device at various temperatures T(° C.) over the frequency.

In this context, $R_{20}$ is the resistance at a temperature of 20° C., T is the ambient temperature, and $k_T$=0.025 1/° C. is the temperature coefficient. In FIG. 3, internal resistance $R_i$ of a related-art, high-performance electrochemical storage device is plotted at various temperatures T (° C.) over the frequency. It becomes clear in this instance that internal resistance $R_i$ decreases with increasing temperature.

SUMMARY

In accordance with the present invention, a method is provided for adapting the voltage supplied by a high-performance electrochemical storage device, the method including: using a high-performance electrochemical storage device to supply a voltage for a load; monitoring the temperature of the high-performance electrochemical storage device; and adapting the voltage supplied by the high-performance electrochemical storage device as a function of a change in the monitored temperature thereof in a way that counters a change in the value of the power density of the high-performance electrochemical storage device attributable to the temperature change.

The inventive method makes it possible to provide a high-performance electrochemical storage device, thus, for example, a conventional supercapacitor or hybrid supercapacitors that are capable of supplying moderate power both in the high-temperature, as well as in the low-temperature range. This is made possible by countering a change in the power density of the high-performance electrochemical storage device to be attributed to a temperature change in the same and caused by a change in the internal resistance of the high-performance electrochemical storage device power density. In other words, the method according to the present invention makes possible an outstanding performance of high-performance electrochemical storage devices by varying the particular voltage windows for various temperature ranges. Furthermore, the method according to the present invention prolongs the service life of high-performance electrochemical storage devices at high temperatures, as well as at low temperatures. In contrast to the related art, the method according to the present invention makes it possible to provide high-performance electrochemical storage devices having an outstanding performance and lifetime, both for high-temperature, as well as low-temperature applications. This makes it possible to broaden the potential application fields of the high-performance electrochemical storage devices for which the inventive method is used. At low temperatures, the method according to the present invention makes it possible to compensate for a decrease in the power density caused by a low ionic conductivity of the electrolyte. This can be accomplished by increasing the potential window, in particular by charging the cell to a higher voltage without the risk of irreparable cell damage. At high temperatures, the method according to the present invention makes it possible to compensate for the high electrolyte degradation rate by reducing the potential window, in particular by discharging the cell to a lower voltage without reducing the power provided to the cell, since the smaller voltage window is compensated by the intrinsically higher ion conductivity of the electrolyte at high temperatures. Overall, therefore, all of this enables the high-performance electrochemical storage device to constantly provide power independently of temperature.

A change in the power density of the high-performance electrochemical storage device to be attributed to a temperature change in the same is preferably fully compensated. In such an embodiment, high-performance electrochemical storage devices are exceptionally suited for operating or for driving loads.

In the adaptation step, the voltage is adapted in a way that allows the power density of the high-performance electrochemical storage device to remain constant while the voltage is supplied. In such an embodiment, high-performance electrochemical storage devices are exceptionally suited for operating or for driving loads.

In a preferred example embodiment, the power of the constant power density of the high-performance electrochemical storage device is calculated using formula $P=U^2/4R_i$, $R_i$ being the internal resistance of the high-performance electrochemical storage device and U being the voltage provided in this supplying step. An increasing temperature of the high-performance electrochemical storage device leads to a reduction in the internal resistance. For this reason, it is preferred that the voltage supplied by the high-performance electrochemical storage device be reduced in response to an increasing temperature thereof. Conversely, a decreasing temperature of the electrochemical high-performance storage device brings about an increase in the internal resistance thereof. For this reason, it is preferred that the voltage supplied by the high-performance electrochemical storage device in response to a decreasing temperature thereof be increased. In such an example embodiment, the voltage from the high-performance electrochemical storage device can be readily supplied in the context of a constant power density.

It is preferred in the adaptation step that the high-performance electrochemical storage device be charged to increase the voltage that can be supplied by the same. It is also preferred in the adaptation step that the high-performance electrochemical storage device be discharged to reduce the voltage that can be supplied by the same.

The high-performance electrochemical storage device is preferably a supercapacitor. It is especially preferred that the high-performance electrochemical storage device be a hybrid supercapacitor. Generally, supercapacitors have a higher power density than lithium-ion batteries, for example. On the other hand, hybrid supercapacitors have a high power density and energy density, and thus function as gap fillers between lithium-ion batteries and supercapacitors.

The monitored temperature of the high-performance electrochemical storage device is preferably an ambient temperature thereof. It is especially preferred that it be a temperature that is measured in the immediate vicinity of the high-performance electrochemical storage device. More particularly, it is preferred that it be a temperature that is measured within the high-performance electrochemical storage device and/or at an outer wall thereof.

According to an example embodiment, a system for the operation of a load includes a high-performance electrochemical storage device with at least one output for the electrically conductive connection to a load. In addition, the system includes at least one sensor that is designed to measure the temperature of the high-performance electrochemical storage device and the voltage at the at least one output thereof. Moreover, the system features a system management unit, which is connected to the at least one sensor and is designed to alter the voltage at the at least one output of the high-performance electrochemical storage device as a function of a change in the temperature thereof in a way that counters a change in the value of the power density of the high-performance electrochemical storage device attributable to the temperature change. It is preferred that the system management unit be designed to alter the voltage at the at least one output of the high-performance electrochemical storage device as a function of a change in the temperature thereof in a way that compensates for a change in the value of the power density of the high-performance electrochemical storage device attributable to the temperature change. This type of system brings to bear the advantages in a device mentioned previously in connection with the inventive method.

It is preferred that the system management unit be designed to adapt the voltage at the at least one output of the high-performance electrochemical storage device in such a way that the power density thereof remains constant while the voltage is supplied. A system of this kind makes it possible for a high-performance electrochemical storage device, such as a supercapacitor, for example, to supply constant power to a load, for example, to the drive of a motor vehicle, independently of temperature. Within the scope of the method, it is preferred that the power density be kept constant during the entire time in which the high-performance electrochemical storage device supplies a voltage.

In a preferred example embodiment, the power of the constant power density of the high-performance electrochemical storage device is calculated using formula $P=U^2/4R_i$, $R_i$ being the internal resistance of the high-performance electrochemical storage device and U being the voltage adapted by the system management unit to the at least one output of the high-performance electrochemical storage device.

The system management unit is preferably designed to induce a charging of the high-performance electrochemical storage device in order to increase the voltage that can be supplied by the same. It is also preferred that the system management unit be designed to induce a discharging of the high-performance electrochemical storage device in order to reduce the voltage that can be supplied by the same.

The system management unit is preferably also designed to measure the voltage dropping across a load connected to the at least one output. In an example embodiment of this type, a load can be operated using a more precisely adjusted voltage and thus more efficiently, as well as more smoothly for the electrochemical high-performance storage device.

The system may also include a power control unit that is designed for altering a current supplied to the at least one output by the high-performance electrochemical storage device. In this type of example embodiment, it is possible to optimize the manner in which the power density of the high-performance electrochemical storage device is maintained.

In an example embodiment, the current supplied to the at least one output by the high-performance electrochemical storage device is altered to correspond to an instantaneously required current of a load that is electroconductively connected to the at least one output. Because the power density is to be kept constant, the system management unit decides about the level of the voltage to be output to the at least one output by the high-performance electrochemical storage device. The power control unit can then advantageously adapt this current to a required load current.

Exemplary embodiments of the present invention are clarified in greater detail on the basis of the drawings and the following description.

DETAILED DESCRIPTION

Figure 4:
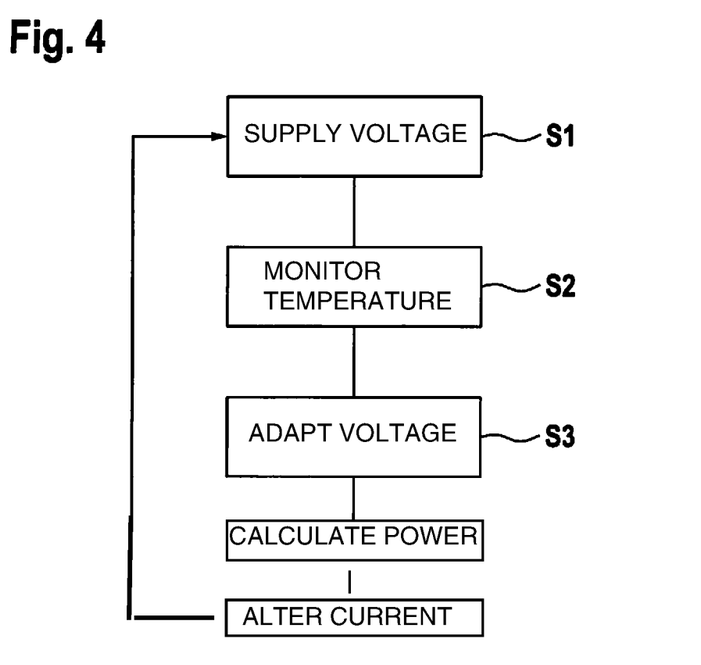
FIG. 4 is a flowchart that illustrates a method according to an example embodiment of the present invention.

FIG. 4 is a flowchart of a method for adapting the voltage supplied by a high performance electrochemical storage device according to an example embodiment. As an example, the high-performance electrochemical storage device is a supercapacitor, more specifically a hybrid supercapacitor. However, the method according to the present invention can also be used for other types of high-performance electrochemical storage devices.

In a first method step S1, the electrochemical storage device supplies a voltage for a load. Purely exemplarily, this load is the drive of a motor vehicle. However, high-performance electrochemical storage devices can operate or drive other loads, in particular also steady-state loads, using a method according to the present invention.

In a second method step S2 of the method, the temperature of the electrochemical high-performance electrochemical storage device is monitored; purely exemplarily in this exemplary embodiment, the temperature being continuously monitored, i.e., for as long as the high-performance electrochemical storage device is in operation, respectively is used for operating the load.

In a third method step S3, the voltage supplied by the high-performance electrochemical storage device is adapted as a function of a change in the monitored temperature of the high-performance electrochemical storage in a way that counters a change in the value of the power density of the high-performance electrochemical storage device attributable to the temperature change. Purely exemplarily in this exemplary embodiment, the voltage is adapted in such a way that the power density of the high-performance electrochemical storage device remains constant while the voltage is supplied. The power of the power density of the high-performance electrochemical storage device, which is kept constant in the context of the method of the present invention, is generally calculated using formula $P=U^2/4R_i$, $R_i$ being the internal resistance of the high-performance electrochemical storage device and U being the voltage provided in this supplying step S1.

Purely exemplarily in this exemplary embodiment, a power density is set as a reference value at a predetermined temperature, here at an ambient temperature of 15° C. However, a power density can also be set as a reference value at a different temperature. It is also possible that a specific initial temperature upon start-up of the high-performance electrochemical storage device or the power density that the high-performance storage device provides at that instant be set as a reference value, or that such a reference value be specified in some other way.

In first method step S1 in this exemplary embodiment, a voltage $U_1$ is supplied for the high-performance electrochemical storage device to drive the motor vehicle. If a measurement performed in the course of second method step S2 reveals that the temperature of the ambient environment of the high-performance electrochemical storage device or of the high-performance electrochemical storage device itself has increased—for example, due to a heating of the overall system because of operation of the same—this leads to a drop in the viscosity of the electrolyte of the high-performance electrochemical storage device. This, in turn, leads to an increase in the conductivity of the electrolyte of the high-performance electrochemical storage device, which, in turn, has the effect of decreasing internal resistance $R_i$ of the same. However, as indicated by the above mathematical relationship, a drop in internal resistance $R_i$ increases power P (see above) and thus enhances the power density. For this reason, in third method step S3, voltage $U_i$ supplied by the high-performance electrochemical storage device is reduced to a voltage value $U_2$ at which the power density is unchanged. This can be accomplished, for example, by appropriately discharging the high-performance electrochemical storage device.

On the other hand, if a measurement performed in the course of second method step S2 reveals that the temperature of the ambient environment of the high-performance electrochemical storage device or of the high-performance electrochemical storage device itself has dropped—for example, due to a cooling in the ambient environment of the high-performance electrochemical storage device—this leads to an increase in the viscosity of the electrolyte of the high-performance electrochemical storage device. This, in turn, leads to a decline in the conductivity of the electrolyte of the high-performance electrochemical storage device, which, in turn, has the effect of increasing internal resistance $R_i$ of the same. However, as indicated by the above mathematical relationship, an increase in internal resistance $R_i$ reduces power P and thus the power density (see above). For this reason, in third method step S3, voltage $U_i$ supplied by the high-performance electrochemical storage device is reduced to a voltage value $U_3$ at which the power density is unchanged. This can be accomplished, for example, by appropriately charging the high-performance electrochemical storage device. Thus, in third method step S3, the voltage supplied in first supplying method step S1 is adapted, respectively altered. This is expressed in FIG. 4 by an arrow, which points from the box representing third method step S3 to the box representing first method step S1. In addition, the power density can also be enhanced by increasing the voltage window. At a voltage window of 1.2 V-2.7 V, an internal resistance of $R_i=3.2$ mOhm at 25° C., and a temperature window of −25° C. to 120° C., for example, the following values can be calculated for power P from the above mathematical relationship for exemplary temperatures −15° C., 25° C., and 120° C.:

for T=−15° C., a power of $$P = \frac{2.7^2 V^2}{4*7.2*10^{-3}\frac{V}{A}} = 253.125 \ W$$

is derived,
for T=25° C., a power of $$P = \frac{1.8^2 V^2}{4*3.2*10^{-3}\frac{V}{A}} = 253.125 \ W$$

is derived, and
for T=120° C., a power of $$P = \frac{1.2^2 V^2}{4*1.42*10^{-3}\frac{V}{A}} = 253.52 \ W$$

is derived. These exemplary calculations reveal that power P provided by high-performance electrochemical storage device is constant independently of the temperature thereof.

In other words, the inventive, voltage-regulating method makes it possible for the voltage to be automatically adapted depending on the temperature range and thus to be used as a compensation element for the rising, respectively decreasing temperature. Thus, at a dropping temperature, the voltage should increase and, at a higher temperature, decrease, to enable the power and the power density to remain constant. This adaptation process has a positive effect on the service life of the corresponding high-performance electrochemical storage devices since, at high voltages, the decomposition rate at high temperatures for the electrolyte is much higher than at low temperatures. Moreover, the low ionic conductivity of the high-temperature electrolyte is compensated by this adaptation of the voltage window.

Figure 5:
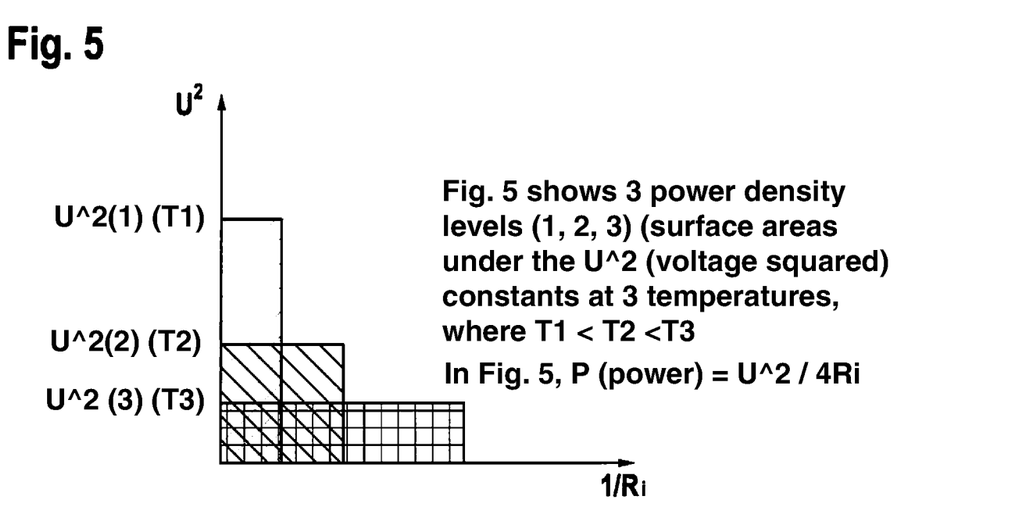
FIG. 5 shows the power density of a high-performance electrochemical storage device in operation for which the method is executed, according to an example embodiment of the present invention.

This relationship is illustrated once again in FIG. 5. FIG. 5 shows the power density of a high-performance electrochemical storage device in operation, for which the exemplary embodiment of an inventive method shown in FIG. 4 is executed. Specifically, FIG. 5 shows the power densities ($U^2$) at three different temperatures $T_1$, $T_2$ and $T_3$, where $T_1<T_2<T_3$. Expressed in more precise terms, in FIG. 5, in first method step S1 of this exemplary embodiment of an inventive method, the square of the voltage supplied in each case by a high-performance electrochemical storage device to a load at three different temperature values $T_1$ through $T_3$ is plotted over the inverse value of internal resistance $R_i$ of the high-performance electrochemical storage device used for supplying this voltage. The surface areas underneath the $U^2$ power density constants in FIG. 5, which can be associated with each of the different temperature values $T_1$ through $T_3$, are of equal value relative to each other since the power density of the high-performance electrochemical storage device is constant at every temperature in correspondence with the exemplary embodiment of an inventive method. Thus, the surface areas in FIG. 5 represent the constant power density.

Figure 6:
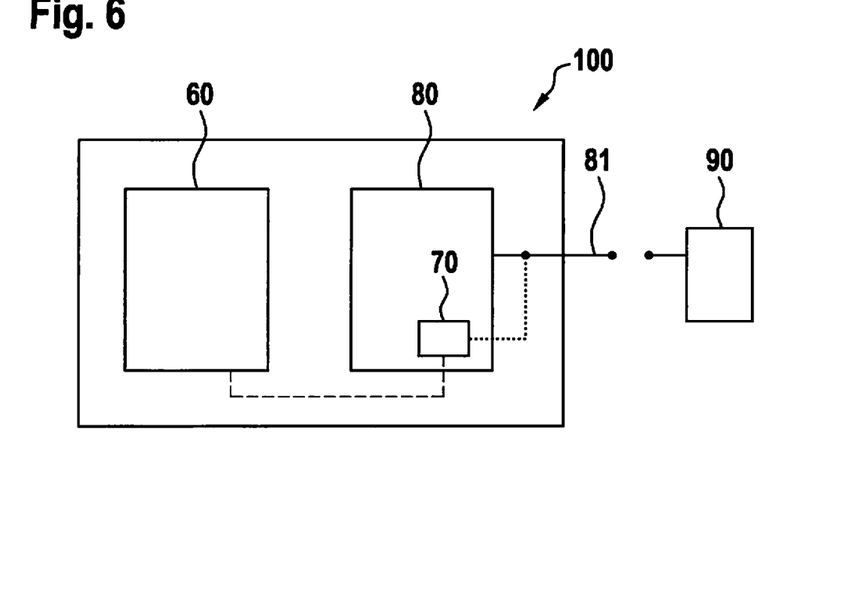
FIG. 6 is a block diagram of a system for the operation of a load according to an example embodiment of the present invention.

FIG. 6 is a block diagram of a system 100 according to an example embodiment of the present invention for the operation of a load 90, which, purely exemplarily in this example embodiment, is a construction machine. System 100 includes a high-performance electrochemical storage device 80, which, purely exemplarily, has an output 81 for electrically conductive connection to load 90—in this case the construction machine—and is configured, purely exemplarily, as a hybrid supercapacitor. In addition, purely exemplarily in this example embodiment, system 100 includes two sensors 70, one of which is designed to measure the temperature of high-performance electrochemical storage device 80, while the other is designed to measure the voltage at output 81 of high-performance electrochemical storage device 80. In addition, system 100 includes a system-management unit 60 connected to sensors 70. The connection is shown in FIG. 6 by a dashed line. Purely exemplarily, in this example embodiment, it is an electrically conductive connection that suffices for transmitting sensor data. However, it can also be a wireless connection that materializes via a transmission network, for example, a radio communication or WLAN network.

System management unit 60 is designed for altering the voltage at output 81 of high-performance electrochemical storage device 80 as a function of a change in the temperature of high-performance electrochemical storage device 80 in a way that counters a change in the value of the power density of high-performance electrochemical storage device 80 attributable to the temperature change. Purely exemplarily in this example embodiment, system management unit 60 is also designed to adapt the voltage at the one output 81 of high-performance electrochemical storage device 80 in such a way that the power density thereof remains constant while the voltage is supplied.

In other words, via sensor 70, system management unit 60 is able to measure the temperature of high-performance electrochemical storage device 80, as well as, secondly, the voltage supplied by high-performance electrochemical storage device 80 to output 81. If system management unit 60 measures an increase in the temperature of high-performance electrochemical storage device 80, then purely exemplarily in this example embodiment, it induces a reduction in the voltage supplied to output 81. If, on the other hand, system management unit 60 measures a decrease in the temperature of high-performance electrochemical storage device 80, then, purely exemplarily in this example embodiment, it induces an increase in the voltage supplied to output 81. In this example embodiment, a discharging of high-performance electrochemical storage device 80 induced by system management unit 60 brings about a reduction in the voltage supplied to output 81. In this example embodiment, a charging of high-performance electrochemical storage device 80 induced by system management unit 60 also brings about an increase in the voltage supplied to output 81. However, the voltage of high-performance electrochemical storage device 80 can also be reduced or increased in a different manner.

Purely exemplarily, in this example embodiment, the energy for charging high-performance electrochemical storage device 80 thereby comes from another high-performance electrochemical storage device, but can also come from a different source. In this example embodiment, the discharging is carried out into another high-performance electrochemical storage device, but can also be carried out into a different energy sink. In other words, in this example embodiment for reducing the voltage at output 81, a different high-performance electrochemical storage device is charged by high-performance electrochemical storage device 80 of system 100, so that the voltage at output 81 always has a value which, in accordance with mathematical relationship $P=U^2/4R_i$, ensures a constant power or a constant power density of high-performance electrochemical storage device 80.

Figure 7:
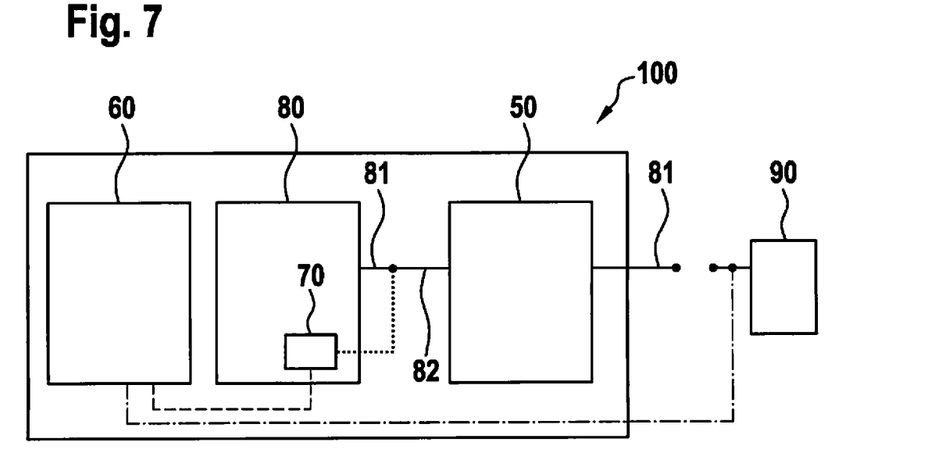
FIG. 7 is a block diagram of a system for the operation of a load according to another example embodiment of the present invention.

FIG. 7 is a block diagram of a system 100 for the operation of a load 90 according to an example embodiment of the present invention. This embodiment is essentially identical to the previously described example embodiment of system 100 shown in FIG. 6, so that the previous description also applies to the identically denoted components in FIG. 7. In essence, the example embodiment shown in FIG. 7 differs from the embodiment shown in FIG. 6 in that system management unit 60 is also designed to measure the voltage dropping across load 90 connected to output 81, thus to the construction machine.

This is indicated in FIG. 7 by a dot-dash line, which represents an electrically conductive signal connection between system management unit 60 and an input of load 90. In this example embodiment, purely exemplarily, system 100 includes a power control unit 50 that is designed to alter a current supplied to output 81 by high-performance electrochemical storage device 80. In other words, purely exemplarily in this example embodiment, a power control unit 50 is located in electrically conductive connection 82 between output 81 and an input of load 90. In more specific terms, power control unit 50 is designed to alter the current supplied to output 81 by high-performance electrochemical storage device 80 to correspond to a current that is instantaneously required by the construction machine.

In other words, in system 100 shown in FIG. 7, load 90, which is the application, and high-performance electrochemical storage device 80, which is the energy source, transmit signals to system management unit 60. These signals provide the instantaneous values of voltage and temperature that system management unit 60 processes and analyzes with the aid of an algorithm, for example, in accordance with the previously described inventive method. System management unit 60 subsequently decides about the level of the voltage supplied by high-performance electrochemical storage device 80 and about the current that flows therefrom to load 90, thus to the application. In this example embodiment, a power control unit 50 additionally adapts this current in accordance with the current required by the load.

What is claimed is:

1. A method for adapting a supply voltage supplied by an electrochemical storage device, the method comprising:
   supplying the supply voltage to a load, which is a drive of a motor vehicle, using the electrochemical storage device;

monitoring a temperature of the electrochemical storage device;

adapting the supply voltage supplied by the electrochemical storage device based on a change in the monitored temperature so as to counter a change in a value of a power density of the electrochemical storage device attributable to the temperature change; and calculating a power (P) of the power density of the electrochemical storage device using a formula: $P=U^2/4R_i$, wherein Ri is an internal resistance of the electrochemical storage device, $U^2$ is the square of the supply voltage adapted by the system management unit to the at least one output of the electrochemical storage device, and U is the supply voltage;

wherein the adapting is performed such that the power density of the electrochemical storage device remains constant while the supply voltage is supplied, wherein the temperature is continuously monitored, for as long as the electrochemical storage device, used for operating the load, is in operation, and wherein the power (P) provided by the electrochemical storage device is approximately independently of the temperature.

2. The method of claim 1, wherein the electrochemical storage device includes a supercapacitor.

3. A system for operating a load, comprising:

an electrochemical storage device that includes at least one output for an electrically conductive connection to the load, which is a drive of a motor vehicle;

at least one sensor configured to measure a temperature of the electrochemical storage device and a supply voltage at the at least one output; and means, connected to the at least one sensor, for altering the supply voltage at the at least one output based on a change in the temperature of the electrochemical storage device so as to counter a change in a value of a power density of the electrochemical storage device attributable to the temperature change;

wherein a power (P) of the power density of the electrochemical storage device is determined using a formula: $P=U^2/4R_i$, wherein Ri is an internal resistance of the electrochemical storage device, $U^2$ is the square of the supply voltage adapted by the system management unit to the at least one output of the electrochemical storage device, and U is the supply voltage;

wherein the means is also for adapting the supply voltage at the at least one output so that the power density remains constant while the supply voltage is supplied, wherein the temperature is continuously monitored, for as long as the electrochemical storage device, used for operating the load, is in operation, and wherein the power (P) provided by the electrochemical storage device is approximately independently of the temperature.

4. The system of claim 3, wherein the means is also for measuring voltage dropping across the load when the load is connected to the at least one output.

5. The system of claim 3, wherein the means is also for altering a current that the electrochemical storage device supplies to the at least one output.

6. The system of claim 3, wherein the means is also for altering a current that the electrochemical storage device supplies to the at least one output to correspond to an instantaneously required current of the load while the load is electroconductively connected to the at least one output.

* * * * *